US012776170B2

(12) United States Patent
Kwak et al.

(10) Patent No.: US 12,776,170 B2
(45) Date of Patent: Oct. 27, 2026

(54) METHOD TO MANAGE SAFETY SOLUTIONS IN A SHARED MOBILITY APPARATUS SYSTEM

(71) Applicants: HYUNDAI MOTOR COMPANY, Seoul (KR); KIA CORPORATION, Seoul (KR); HYUNDAI MOBIS CO., LTD., Seoul (KR)

(72) Inventors: Dae Young Kwak, Hwaseong-si (KR); Mun Seok Jeong, Hwaseong-si (KR); Jang Mook Lim, Hwaseong-si (KR); Tae Hyeong Kim, Yongin-si (KR); Garam Jeong, Yongin-si (KR); Seok Hoon Ko, Yongin-si (KR); Dae Chang Jung, Hwaseong-si (KR)

(73) Assignees: HYUNDAI MOTOR COMPANY, Seoul (KR); KIA CORPORATION, Seoul (KR); HYUNDAI MOBIS CO., LTD., Seoul (KR)

( * ) Notice: Subject to any disclaimer, the term of this patent is extended or adjusted under 35 U.S.C. 154(b) by 49 days.

(21) Appl. No.: 18/961,438

(22) Filed: Nov. 26, 2024

(65) Prior Publication Data

US 2025/0329195 A1 Oct. 23, 2025

(30) Foreign Application Priority Data

Apr. 22, 2024 (KR) ........................ 10-2024-0053324

(51) Int. Cl.
*B60R 21/231* (2011.01)
*B62J 27/20* (2020.01)
(Continued)

(52) U.S. Cl.
CPC ............ *G07C 5/008* (2013.01); *B60R 21/231* (2013.01); *B62J 27/20* (2020.02); *B60R 2021/0048* (2013.01); *B60R 25/209* (2013.01)

(58) Field of Classification Search
CPC ........ G07C 5/008; B62J 27/20; B60R 21/231; B60R 25/209; B60R 2021/0048
(Continued)

(56) References Cited

U.S. PATENT DOCUMENTS

2017/0325533 A1* 11/2017 Allen ........................ A42B 3/12
2020/0184455 A1* 6/2020 Anantha ............ G06Q 20/3674
(Continued)

OTHER PUBLICATIONS

Jesudoss A, Design of Smart Helmet for Accident Avoidance, Apr. 6, 2019, International Conference on Communication and Signal Processing (Year: 2019).*

*Primary Examiner* — Matthias S Weisfeld
(74) *Attorney, Agent, or Firm* — MCDONNELL BOEHNEN HULBERT & BERGHOFF LLP

(57) ABSTRACT

An embodiment of the present disclosure provides a method for managing a safety solution in a shared mobility apparatus system, wherein the method may include identifying whether the safety kit is stored in the safety kit storage case, identifying whether an applicant of the mobility apparatus withdraws and wears the safety kit identified as being stored in the safety kit storage case, in response to the applicant being identified as wearing the safety kit, the management server unlocking a starting mode of the mobility apparatus, and in response to confirming that an engine of the mobility apparatus with the unlocked starting mode is turned on, the management server notifying that charging starts according to use of the mobility apparatus to a mobility apparatus APP of the applicant.

12 Claims, 3 Drawing Sheets

(51) Int. Cl.
*G07C 5/00* (2006.01)
*B60R 21/00* (2006.01)
*B60R 25/20* (2013.01)

(58) Field of Classification Search
USPC .............................................................. 701/2
See application file for complete search history.

(56) References Cited

U.S. PATENT DOCUMENTS

| | | | | |
|---|---|---|---|---|
| 2020/0297059 | A1* | 9/2020 | Viner | A42B 3/006 |
| 2020/0298925 | A1* | 9/2020 | Viner | A42B 3/006 |
| 2021/0284267 | A1* | 9/2021 | Park | B62J 11/24 |
| 2023/0147144 | A1* | 5/2023 | Avila | E05D 5/04<br>340/426.1 |

* cited by examiner

METHOD TO MANAGE SAFETY SOLUTIONS IN A SHARED MOBILITY APPARATUS SYSTEM

CROSS-REFERENCE TO RELATED APPLICATION

The present application claims priority to Korean Patent Application No. P2024-0053324, filed on Apr. 22, 2024, the entire contents of which are incorporated herein for all purposes by this reference.

TECHNICAL FIELD

The present disclosure relates to a method to manage safety solutions in a shared mobility apparatus system including at least one mobility apparatus, a safety kit, a safety kit storage case included in the mobility apparatus to store the safety kit, and a management server to manage the mobility apparatus.

BACKGROUND

Recently, as the use of smart mobility apparatus for the first mile or last mile has becomes more active, sharing services such as sharing electric kickboards are experiencing significant market growth.

Regulations on essential devices to ensure the safety of users when using electric kickboards have increased, and recently, the wearing of a safety device such as a helmet for the safety of users when using electric kickboards is required. In particular, considering that serious injuries occur in the head and face of users in electric kickboard accidents, this requirement is considered appropriate.

Users of personal mobility apparatus devices such as electric kickboards may use their own helmets or share helmets provided by sharing service providers.

However, using the safety helmet is not popular due to the inconvenience of the head being pressed or tangled when wearing a safety helmet and the inconvenience of having to carry around a personal safety helmet.

There is additionally the issue that the safety helmet provided by the shared service is exposed to the outside and the repeated use by an unspecified number of people causes concerns regarding contamination and hygiene.

When a user fails to carry around a safety helmet, the users are exposed to the risk of theft and loss. Thus, it is difficult for the shared service providers to smoothly provide the safety helmets to the users.

Technologies have been developed to solve the above-described problems, but despite the efforts to ensure user safety, the effectiveness of technologies has recently been reduced as users often fail to wear safety helmets.

SUMMARY

An embodiment of the present disclosure is related to providing a method for solving the above-described problems.

According to an embodiment of the present disclosure, a method for managing safety solutions in a shared mobility apparatus system aims to prevent mobility apparatus users from not wearing safety kits in advance by restricting the starting of the mobility apparatus vehicle when the users fail to wear the safety kits in a shared mobility apparatus system including at least one mobility apparatus, a safety kit, a safety kit storage case included in the mobility apparatus for storing the safety kit, and a management server for managing the mobility apparatus.

As an exemplary embodiment of the present disclosure, there is provided a method for managing a safety solution in a shared mobility apparatus system including at least one mobility apparatus, a safety kit, a safety kit storage case provided in the mobility apparatus for storing the safety kit, and a management server for managing the mobility apparatus, the method comprising identifying, by the safety kit storage case, whether the safety kit is stored in the safety kit storage case, identifying, by the safety kit, a wearing status of the safety kit, based on the wearing status of the safety kit, unlocking, by the management server, a starting mode of the mobility apparatus, and in response to the mobility apparatus being turned on, notifying, by the management server, that charging starts according to use of the mobility apparatus through a mobility apparatus APP.

The method may further include identifying, by the mobility apparatus, whether the mobility apparatus is turned off, in response to the mobility apparatus being turned off, identifying, by the safety kit storage case, whether the safety kit is returned to the safety kit storage case, and in response to the safety kit being returned, notifying, by the management server, that charging counting according to the use of the mobility apparatus is completed through the mobility apparatus APP.

Identifying whether the safety kit is stored in the safety kit storage case may include requesting, by the mobility apparatus, a storage status of the safety kit to the safety kit storage case, identifying, by the safety kit storage case, whether the safety kit is present inside the safety kit storage case, and in response to the safety kit not being present inside the safety kit storage case, notifying, by the safety kit storage case, that the safety kit is not present to the mobility apparatus.

The method may further include requesting, by the mobility apparatus, maintenance of the safety kit to the management server in response to the notification of the safety kit not being present.

Identifying the wearing status of the safety kit may include identifying, by the safety kit storage case, whether the safety kit stored inside the safety kit storage case is withdrawn, in response to the safety kit being withdrawn, notifying, by the mobility apparatus, that the safety kit is withdrawn to the mobility apparatus, connecting, by the mobility apparatus, data communication to the safety kit, and detecting, by the safety kit, an operation status of the safety kit in the mobility apparatus.

The safety kit may include an air tube configured to expand by inflowing air and contract by outflowing air in a safety helmet shape when expanded, an air pump for inflow and outflow of air, a control switch configured to operate the air pump, and a sensor configured to detect the wearing status, and wherein the safety kit transmits data on operation statuses of the control switch and the sensor to the mobility apparatus in response to the mobility apparatus being connected to the safety kit in data communication.

The identifying whether the safety kit is withdrawn may further include in response to the safety kit not being withdrawn within a predetermined period of time, notifying that the safety kit is not withdrawn to the mobility apparatus, and performing, by the mobility apparatus, a user request and a guidance on the safety kit to a mobility apparatus APP.

The unlocking the starting mode of the mobility apparatus may include transmitting data according to an operation status of the safety kit to the management server, identifying, by the management server, whether the safety kit is worn based on the data according to the operation status of the safety kit, and in response to the identification that the safety kit is worn, unlocking, the management server, the starting mode of the mobility apparatus.

The notifying that the charging starts may include identifying whether the mobility apparatus is turned on, in response to the mobility apparatus being turned on, notifying, by the mobility apparatus, that the mobility apparatus is turned on to the management server, and notifying, by the management server, that the charging starts according to the use of the mobility to the mobility apparatus APP.

The method may further comprise, after the notifying that the charging starts, counting the charging according to a usage time in the management server.

The identifying whether the safety kit is returned may include requesting, by the mobility apparatus, whether the safety kit is returned to the safety kit storage case, identifying, by the safety kit storage case, whether the safety kit is returned within a predetermined period of time, and in response to the safety kit not being present inside the safety kit storage case, notifying that the safety kit is not returned to the mobility apparatus.

The method may further include performing, by the mobility apparatus, request and guidance on returning of the safety kit to the mobility apparatus APP in response to the notification of the safety kit not being returned.

The method may further comprise switching, by the safety kit storage case, a state of the safety kit storage case to a locked state in response to the safety kit being returned.

According to an embodiment of the present disclosure, a method for managing a safety solution in a shared mobility apparatus system is provided, which prevents mobility apparatus users from not wearing safety kits in advance by restricting the starting of the mobility apparatus when the users of the mobility apparatus fail to wear the safety kit.

DETAILED DESCRIPTION

Figure 1:
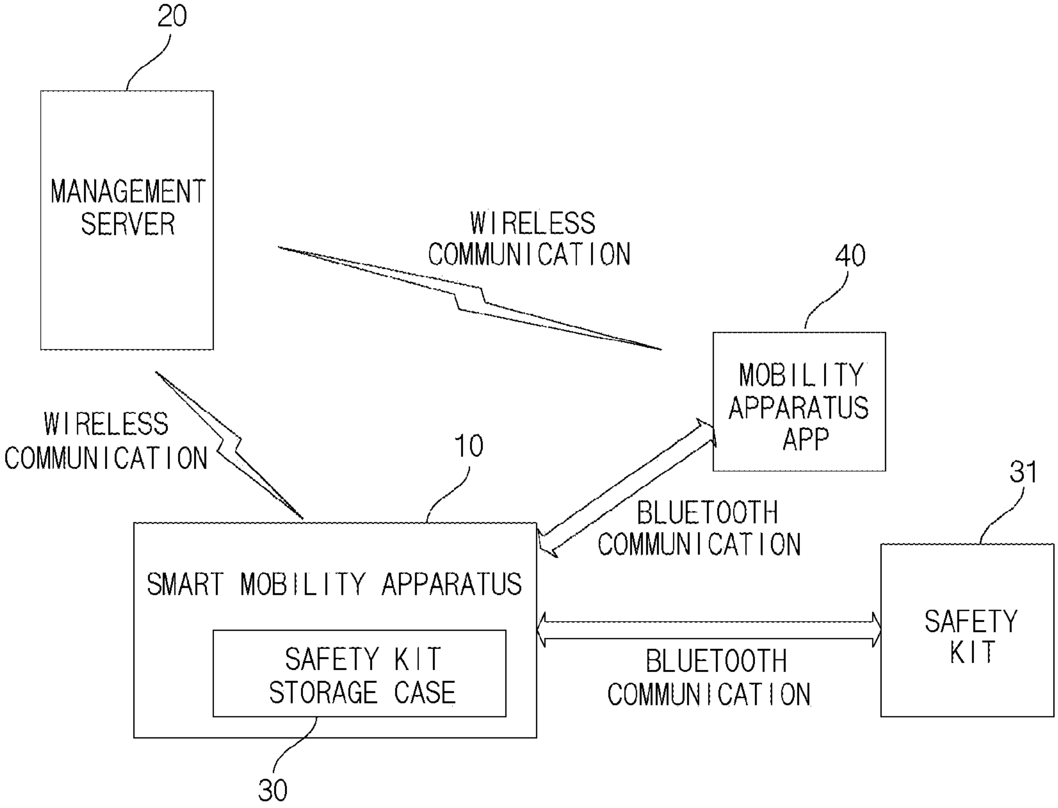
FIG. 1 is an exemplary block configuration diagram to explain a shared mobility apparatus system according to an embodiment of the present disclosure.

While embodiments are described with reference to the accompanying drawings, it should be understood that various changes and modifications may be made in the invention. Further, it should be understood that the invention is not limited to the specific embodiments thereof, and various changes, equivalences, and substitutions may be made without departing from the scope and spirit of the invention.

In the embodiments of the present disclosure, terms such as "module", "unit", "part", and the like are terms used for nominal distinct between components, and it should not be interpreted as assuming that they are physically and chemically separated or capable of being separated or divided.

Terms containing ordinal numbers, such as "first", "second", etc., may be used to describe various components, but the components are not limited by the terms. These terms may be used only in a nominal sense to differentiate one component from another component, and their mutual sequential meaning will be understood through the context of the corresponding description, not through such terms.

The term "and/or" is used to include all instances of any combination of multiple items being the subject. For example, "A and/or B" includes all three cases: "A", "B", and "A and B".

When a component is used to be "coupled" or "connected" to another component, it will be understood that the component may be either connected directly to another component, or connected indirectly via another medium.

The terms in the present application are used to describe an exemplary embodiment and do not intend to restrict and/or limit the present disclosure. Singular forms are intended to include plural forms unless the context clearly indicates otherwise. According to an embodiment of the present disclosure, terms such as "comprise" or "consist of" are used to designate presence of characteristics, numbers, steps, operations, elements, components or a combination thereof, and do not foreclose the presence or possibility of addition of one or more other characteristics, numbers, steps, operations, elements, components or a combination thereof.

Unless otherwise defined, all terms used in the embodiment of the present disclosure including technical or scientific terms, have the same meaning as generally understood by an ordinary person skilled in the technical field to which the present disclosure pertains. Terms defined in commonly used dictionaries will be interpreted as having a meaning consistent with the meaning in the context of the related technology, and unless clearly defined in this application, should not be interpreted in an ideal or excessively formal sense.

In addition, the terms "unit", "control unit", "control device", or "controller" are only widely used for names of devices that control the corresponding functions, and are not construed as being generic functional units. For example, devices using the terms may include a communication device that communicates with another controller or sensor to control the corresponding function, a computer-readable recording media that stores operating systems, logic commands, input/output information, etc., and at least one or more of processor that performs determination, calculation, decision, etc. used to control the corresponding function.

A processor may include a semiconductor integrated circuit and/or electronic elements that perform at least one or more of comparison, determination, calculation, and decision to achieve a programmed function. For example, the processor may be one or the combination of a computer, a microprocessor, a CPU, an ASIC, and electronic circuits (circuitry, logic circuits).

A computer-readable recording medium (or referred to as memory) includes all types of storage devices that store data that is read by a computer system. Examples of the computer-readable recording medium may include at least one a memory of flash memory type, hard disk type, micro type, and card type (e.g. Secure Digital Card (SD Card) or eXtream Digital Card (XD Card)), and a memory of Random Access Memory (RAM), Static RAM (SRAM), Read-Only Memory (ROM), Programmable ROM (PROM), Electrically Erasable PROM (EEPROM), and magnetic RAM (MRAM), a magnetic disk, and an optical disk type.

Such recording medium may be electrically connected to the processor, and the processor may load and record data from the recording medium. The recording medium and processor may be integrated or may be physically separated.

An embodiment of the present disclosure will be explained with reference to the drawings.

Figure 2A:
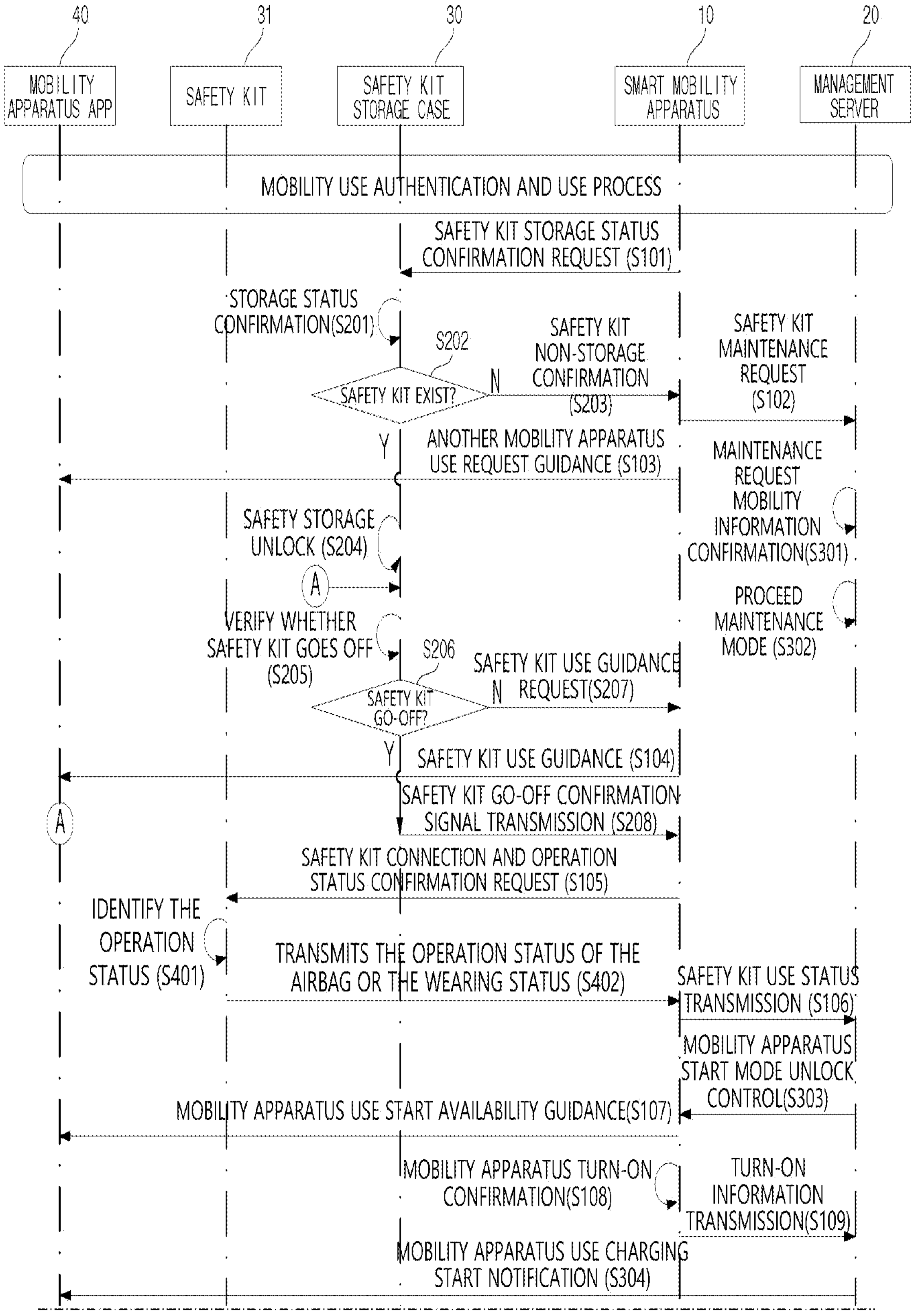
FIG. 2A is a signal flow exemplary diagram to explain a method for managing a safety solution in a shared mobility apparatus system according to an embodiment of the present disclosure.
Figure 2B:
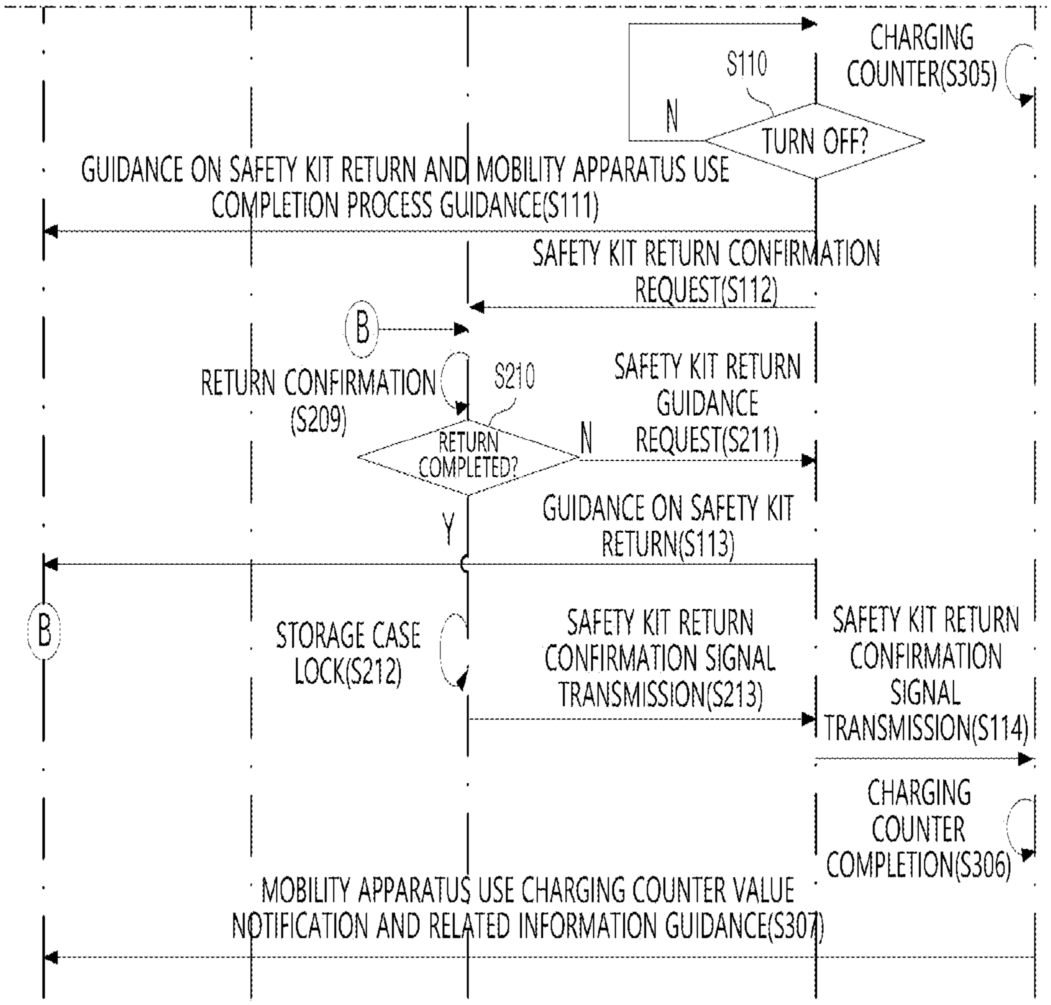
FIG. 2B is a signal flow exemplary diagram to explain a method for managing a safety solution in a shared mobility apparatus system according to an embodiment of the present disclosure.

FIG. 1 is an exemplary block configuration diagram to explain a shared mobility apparatus system, and FIG. 2A and FIG. 2B show signal flow exemplary diagrams to explain a method for managing a safety solution in a shared mobility apparatus system.

Referring to FIG. 1, a method for managing a safety solution according to an embodiment may include at least one smart mobility apparatus 10 (e.g., electric kickboard, electric bicycle, electric wheel, etc.), a safety kit 31, a safety kit storage case 30 placed in the smart mobility apparatus 10 for storing the safety kit 31, and a management server 20 for managing the smart mobility apparatus 10.

The safety kit 31 may be provided in various types, but all the types are not specifically disclosed. An exemplary embodiment of the present disclosure may comprise an airbag type as the safety kit. In detail, the safety kit 31 may include an air tube that expands by inflowing air and contracts by outflowing air in the shape of a safety helmet when expanded, an air pump for inflow and outflow of air, a control switch for the operation of the air pump. And also, the safety kit 31 may further comprise a sensor for detecting a wearing status and a controller configured to control operations of other components of the kit 31. The sensor for detecting the wearing status may comprise a capacitive proximity sensor which is exposed on the kit 31 at a location where skin of the user's body, such as the neck, is able to access in a state where the kit 31 was worn by the user. Alternatively or additionally, the sensor for detecting the wearing status may comprise a push button switch which is depressed by the user's body like a finger or the neck in a state where the kit 31 was worn by the user. The kit 31 also may comprise a flexible case housing an airbag therein and comprising two extended portions the both ends of which can be met together by the portions being bended around the user's neck. When the smart mobility apparatus 10 is connected in data communication by a communication module (e.g., Bluetooth communication) of the kit 31, the safety kit 31 may transmit data on the operation statuses of the control switch and the sensor to the smart mobility apparatus 10.

Referring to FIG. 2A and FIG. 2B, the method for managing a safety solution in a shared mobility apparatus system as described above will be detailed.

It is assumed that user authentication procedure for mobility apparatus use is performed. The following process is explained based on the time point when an applicant wishes to use arbitrary smart mobility apparatus 10 through a mobility apparatus APP 40.

At step S101, the smart mobility apparatus 10, when a use request is transmitted through the mobility apparatus 40 by Near Field Communication such as Bluetooth communication, may request to confirm whether the safety kit 31 is stored in the safety kit storage case 30, and the safety kit storage case 30 may identify the storage status through the process of step S201. As an exemplary embodiment, the safety kit storage case 30 may comprise an electrical locking mechanism which is operated automatically by a processor. A well-known electrical locking mechanism may be applied to the embodiment of the present disclosure.

At step S202, when it is determined that the safety kit 31 is not present, a notification may be sent that the safety kit 31 is not present in the smart mobility apparatus 10 through the process of step 203. To this end, the safety kit storage case 30 may further comprise a push button switch at a location where the switch is depressed by the safety kit 31 when the kit 31 is housed therein. The processor may determine whether the kit 31 is present in the case 30 or not through the operation of the push button switch. Alternatively or additionally, the case 30 may also determine the presence of the kit 31 through the operation of the electrical locking mechanism.

The smart mobility apparatus 10 may request the maintenance of the safety kit 31 to the management server 20 through the process of step S102. The smart mobility apparatus 10 may transmit a notice requesting to use another mobility apparatus to the applicant through the process of step S103.

The management server 20 may identify information on the mobility apparatus (location information, terminal information, etc.) that requests maintenance through the process of step S301, and perform a maintenance mode through the process of step S302.

When it is determined that the safety kit 31 is present at step S202, the lock state of the safety kit storage case 30 may be switched to the unlocked state through the process of step S204.

The safety kit storage case 30 may determine whether the safety kit 31 is withdrawn within a predetermined period of time through the processes of step S205 and step S206.

When it is determined that the safety kit 31 is not withdrawn within a predetermined period of time, it may be notified that the safety kit 31 is not withdrawn to the smart mobility apparatus 10 through the process of step S207, and the smart mobility apparatus 10 may perform use request and guide of the safety kit 31 to the mobility apparatus APP 40 of the applicant through the process of step S104.

When it is determined that the safety kit 31 is withdrawn through the process of step S206, it may be notified that the safety kit 31 is withdrawn to the smart mobility apparatus 10 through the process of step S208.

The smart mobility apparatus 10 may connect the safety kit 31 to data communication through the process of step S105, and request to confirm the operation status.

The safety kit 31 may identify the operation status through the process of step S401, and the smart mobility apparatus 10 may detect the operation status of the safety kit 31 through the process of step S402 where the safety kit 31 transmits the operation status of the airbag or the wearing status to the smart mobility apparatus 10.

The data on the operation status of the safety kit 31 may be transmitted to the management server 20 through the process of step S106, and the management server 20 may switch a starting mode of the smart mobility apparatus 10 to an unlocked state through the process of step S303 (typically, the starting mode of the smart mobility apparatus 10 is a locked state and released by the management server 20).

The smart mobility apparatus 10, when the starting mode is switched to the unlocked state by the management server 20, may guide to the mobility apparatus APP 40 of the applicant that the mobility apparatus is available at step S107.

The applicant may start the engine to start to use the mobility apparatus and it may be confirmed at step S108 to be transmitted to the management server 20 through the process of step S109.

The management server 20 may notify that charging for mobility apparatus use starts to the mobility apparatus APP 40 of the applicant through the process of step S304 and may count charging through the process of step S305.

The smart mobility apparatus 10 may determine whether the engine is switched to the off state through the process of step S110, and when it is determined that the engine is switched to the off state, the smart mobility apparatus 10 may proceed to step S111 and guide the returning of the safety kit 31 and the process of ending the use of the mobility apparatus APP 40.

The smart mobility apparatus 10 may request whether the safety kit 31 is returned to the safety kit storage case 30 through the process of step S112.

The safety kit storage case 30 may determine whether the safety kit 31 is returned within a predetermined period of time through the processes of step S209 and step S210.

When it is determined that the safety kit 31 is not returned with a predetermined period of time, it may be identified that the safety kit 31 is not returned to the smart mobility apparatus 10 through the process of step S211, and the smart mobility apparatus 10 may perform request and guidance on returning the safety kit to the mobility apparatus APP 40 of the applicant through the process of step S113.

When it is determined that the safety kit 31 is returned through the process of step S210, the safety kit storage case 30 may be switched to the locked state through the process of step S212 and may identify that the safety kit 31 is returned to the smart mobility apparatus 10 through the process of step S213.

The smart mobility apparatus 10 may notify that the safety kit 31 is returned to the management server 20 through the process of step S114, the management server 20 may complete the charging counting through the process of step S306 and notify that the charging counting according to the use of the mobility apparatus is completed to the mobility apparatus APP 40 of the applicant.

Although not shown, the management server 20 may switch the starting mode of the smart mobility apparatus 10 to the locked state to controls to prevent the engine from starting.

As described above, an embodiment according to the present disclosure relates to a method for managing a safety solution in a shared mobility apparatus system to prevent mobility apparatus users from not wearing the safety kits by restricting the starting of the engine of the mobility apparatus when the users of the mobility apparatus fail to wear the safety kits.

Also, an embodiment provides the effect of reducing cases where the safety kit is not returned due to the carelessness of the user as the charging counting may not stop unless the safety kit is returned.

Although the above description focuses on examples, this is only an example and does not limit the present disclosure, and those skilled in the art will understand that various variations and applications are possible without departing from the substantial characteristics of an embodiment of the present disclosure. For example, in the embodiment, each component may be modified and implemented. The variations and differences in application should be construed as being included in the scope of the present disclosure as defined in the appended claims.

What is claimed is:

1. A method for managing a safety solution in a shared mobility apparatus system including at least one mobility apparatus, a safety kit, a safety kit storage case provided in the mobility apparatus for storing the safety kit, and a management server for managing the mobility apparatus, the method comprising:

identifying, by the safety kit storage case, whether the safety kit is stored in the safety kit storage case;

identifying, by the safety kit storage case, whether the safety kit stored inside the safety kit storage case is withdrawn;

in response to the safety kit not being withdrawn within a predetermined period of time, performing, by the mobility apparatus, a user request and a guidance on the safety kit to a mobility apparatus APP;

identifying, by the safety kit, a wearing status of the safety kit;

based on the wearing status of the safety kit, unlocking, by the management server, a starting mode of the mobility apparatus; and based on receiving from the mobility apparatus a notification that the mobility apparatus has been turned on, notifying, by the management server, that charging starts according to use of the mobility apparatus through the mobility apparatus APP.

2. The method as claimed in claim 1, further comprising:

identifying, by the mobility apparatus, whether the mobility apparatus is turned off;

in response to the mobility apparatus being turned off, identifying, by the safety kit storage case, whether the safety kit is returned to the safety kit storage case; and in response to the safety kit being returned, notifying, by the management server, that charging counting according to the use of the mobility apparatus is completed through the mobility apparatus APP.

3. The method as claimed in claim 2, wherein identifying whether the safety kit is returned comprises:

requesting, by the mobility apparatus, whether the safety kit is returned to the safety kit storage case;

identifying, by the safety kit storage case, whether the safety kit is returned within a predetermined period of time; and in response to the safety kit not being present inside the safety kit storage case, notifying that the safety kit is not returned to the mobility apparatus.

4. The method as claimed in claim 3, further comprising:

performing, by the mobility apparatus, request and guidance on returning of the safety kit to the mobility apparatus APP in response to the notification of the safety kit not being returned.

5. The method as claimed in claim 2, further comprising switching, by the safety kit storage case, a state of the safety kit storage case to a locked state in response to the safety kit being returned.

6. The method as claimed in claim 1, wherein identifying whether the safety kit is stored in the safety kit storage case comprises:

requesting, by the mobility apparatus, a storage status of the safety kit to the safety kit storage case;

identifying, by the safety kit storage case, whether the safety kit is present inside the safety kit storage case; and in response to the safety kit not being present inside the safety kit storage case, notifying, by the safety kit storage case, that the safety kit is not present to the mobility apparatus.

7. The method as claimed in claim 6, further comprising:

requesting, by the mobility apparatus, maintenance of the safety kit to the management server in response to the notification of the safety kit not being present.

8. The method as claimed in claim 1, wherein identifying the wearing status of the safety kit comprises:

in response to the safety kit being withdrawn, notifying, by the mobility apparatus, that the safety kit is withdrawn to the mobility apparatus;

connecting, by the mobility apparatus, data communication to the safety kit; and detecting, by the safety kit, an operation status of the safety kit in the mobility apparatus.

9. The method as claimed in claim 8, wherein the safety kit comprises:

an air tube configured to expand by inflowing air and contract by outflowing air in a safety helmet shape when expanded;

an air pump for inflow and outflow of air;

a control switch configured to operate the air pump; and a sensor configured to detect the wearing status, and wherein the safety kit transmits data on operation statuses of the control switch and the sensor to the mobility apparatus in response to the mobility apparatus being connected to the safety kit in data communication.

10. The method as claimed in claim 8, wherein unlocking the starting mode of the mobility apparatus comprises:

transmitting data according to an operation status of the safety kit to the management server;

identifying, by the management server, whether the safety kit is worn based on the data according to the operation status of the safety kit; and in response to the identification that the safety kit is worn, unlocking, the management server, the starting mode of the mobility apparatus.

11. The method as claimed in claim 1, wherein notifying that the charging starts comprises:

identifying whether the mobility apparatus is turned on;

in response to the mobility apparatus being turned on, notifying, by the mobility apparatus, that the mobility apparatus is turned on to the management server; and notifying, by the management server, that the charging starts according to the use of the mobility to the mobility apparatus APP.

12. The method as claimed in claim 11, further comprising, after the notifying that the charging starts, counting the charging according to a usage time in the management server.

* * * * *